United States Patent [19]

Speggiorin

[11] Patent Number: 5,228,290
[45] Date of Patent: Jul. 20, 1993

[54] HYDRODYNAMIC VARIATOR OF VELOCITY HAVING RADIAL PISTONS

[75] Inventor: Giuseppe Speggiorin, Vicenza, Italy
[73] Assignee: Var-Spe S.p.A., Vicenza, Italy
[21] Appl. No.: 578,569
[22] Filed: Sep. 6, 1990

[30] Foreign Application Priority Data

Sep. 28, 1989 [IT] Italy ................... 85653 A/89

[51] Int. Cl.⁵ .............................................. F16D 39/00
[52] U.S. Cl. ........................................ 60/482; 60/488;
60/497; 91/497; 92/12.1; 92/58; 92/72;
417/219
[58] Field of Search ................ 60/403, 459, 487, 488,
60/490, 491; 91/497, 496; 92/12.1, 58, 68, 72;
417/219

[56] References Cited

U.S. PATENT DOCUMENTS

| | | | |
|---|---|---|---|
| 2,237,018 | 4/1941 | Tweedale | 60/487 |
| 3,190,074 | 6/1965 | Johns | 60/487 |
| 3,404,584 | 10/1968 | Trautmann | 60/487 |
| 3,654,761 | 4/1972 | Eickmann | 60/488 |
| 3,892,167 | 7/1975 | Becker | 91/497 |
| 4,109,618 | 8/1978 | Daniels | 91/496 |
| 4,794,756 | 1/1989 | Iseman | 60/487 |
| 4,982,566 | 1/1991 | Kaler et al. | 60/487 |

FOREIGN PATENT DOCUMENTS

| | | | |
|---|---|---|---|
| 509629 | 1/1955 | Italy | 60/490 |
| 511620 | 1/1955 | Italy | 60/487 |
| 535917 | 11/1955 | Italy | 60/487 |
| 790434 | 11/1967 | Italy | |

*Primary Examiner*—Edward K. Look
*Assistant Examiner*—Hoang Nguyen
*Attorney, Agent, or Firm*—Bucknam and Archer

[57] ABSTRACT

The improved hydrodynamic variator of velocity comprises a pump (3) having radial pistons and a hydromotor (4) also having radial pistons. At least the pump is arranged with a variable eccentricity and there is provided a central body (56) the latter having frontal distributors (30 and 31) which are placed in communication with the radial cylindrical cavities respectively of the pump and the hydromotor by means of the openings of the conduits (32 and 33). By varying the eccentricity of the pump, the rate of flow of the liquid in the pump is varied, thus causing a variation in the number of turns of the hydromotor.

5 Claims, 6 Drawing Sheets

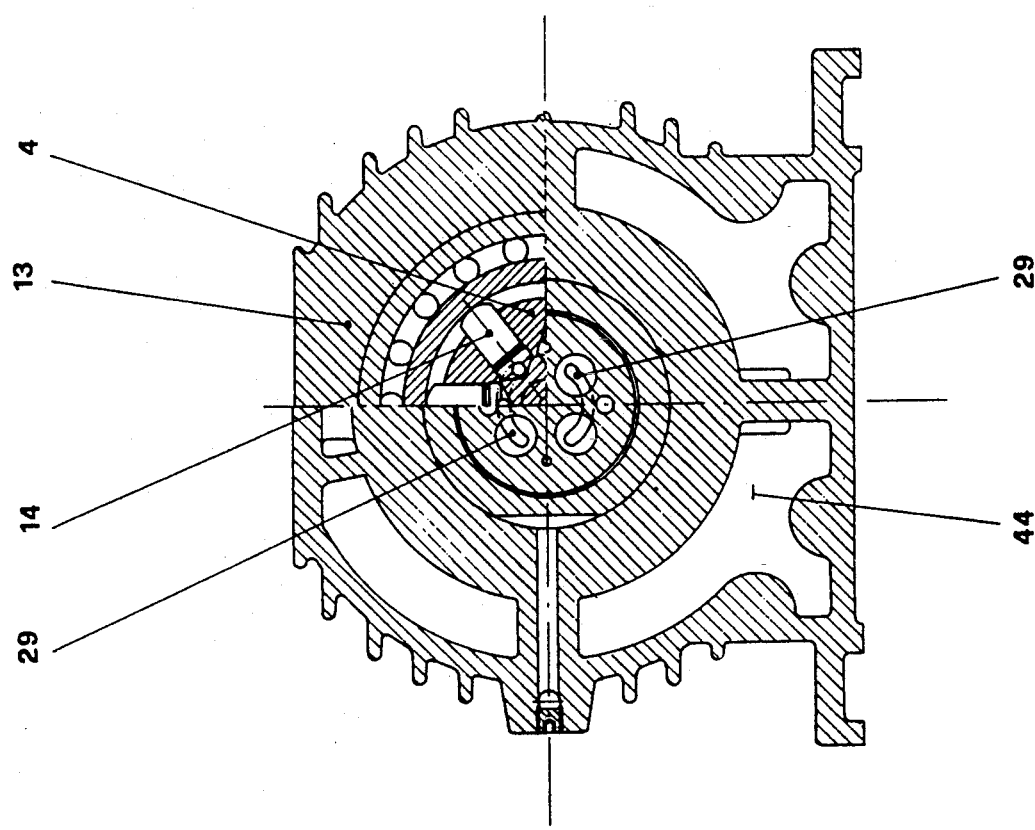

HYDRODYNAMIC VARIATOR OF VELOCITY HAVING RADIAL PISTONS

The present invention relates to hydrodynamic variators of velocity and more specifically has the object of improving the variators of the same type presently existing in commerce. In particular, the object is to improve the hydrodynamic variators of velocity, having radial pistons as described in Italian patent 790,434 filed on Apr. 1, 1967 by VAR-SPE of Speggiorin & C. s.a.s.

The apparatus described in the above mentioned patent comprises a pump having radial pistons and a hydromotor, also having radial pistons connected among themselves by means of a conduit shaft with a circulation of liquid being established among them through channels formed within the central shaft. The variable eccentricity of the pump and/or of the hydromotor determine the variations of velocity of the conduit shaft.

The above mentioned variator, although it has had remarkable success in practice particularly in the field of small and average power, has presented some drawbacks.

One object of the present invention is to eliminate these drawbacks with the variator of the present invention. One of the drawbacks, in particular, is due to the excessive wear of the heads of the radial pistons of the pump and the hydromotor, wear which is particularly noticeable at high velocity. This makes it necessary to substitute frequently the sliding rings of the same pistons, a fact which causes loss of time, expenses in dismounting and subsequently mounting again the variator in the mechanical assembly in which it is inserted.

Another drawback of the variator described in the above mentioned patent is due to the substantial cost of manufacture of the central part of the variator which comprises the so called impeller pump which increases substantially the overall cost of manufacturing the variator. In addition, the noise of the variator is not to be overlooked, particularly at high velocity of rotation and in relation to the high power being transmitted. In addition, occasionally there is noticed, as a result of the excessive heat given off, that the bushings become blocked on the shaft of the distributor.

All these drawbacks are eliminated with the improved variator of the present invention which is much less noisy and much more economical than the known variator and in addition is subject to much less wear particularly in the paths of contact between the radial pistons and the sealing rings.

In particular, the presence of the auto balancing frontal distributors in the heads of the rotors and fixed with respect to the frame of the apparatus constitutes undoubtedly an improvement with respect to the functionality of the apparatus which is also much more economical to manufacture.

Other particular features of the variator of the present invention will become more clear from the following detailed description with reference to the accompanying drawings of which:

FIG. 6 is a transversal view in cross section of the apparatus according to lines VI—VI of FIG. 1.

Figure 1:
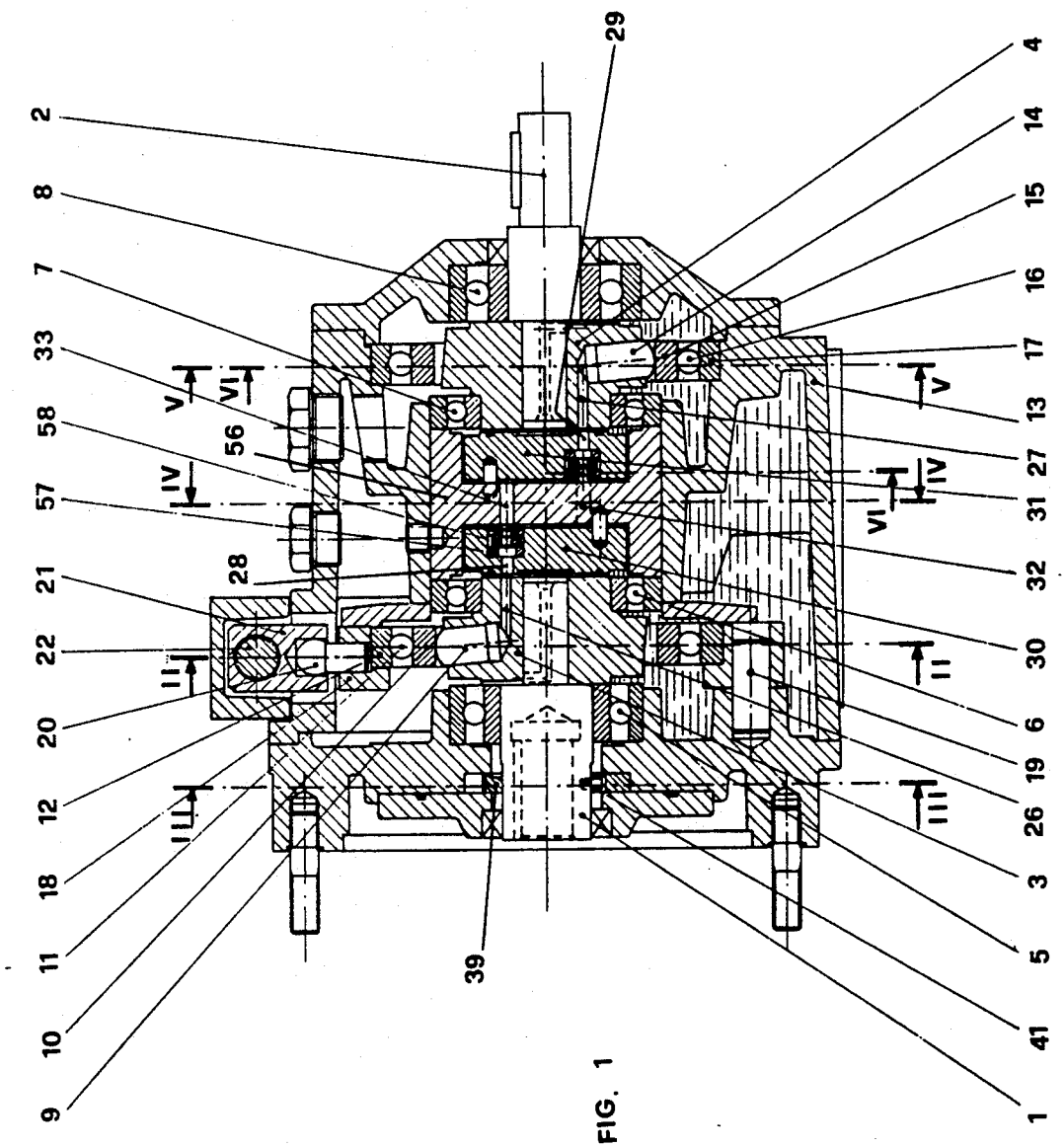
FIG. 1 is a longitudinal axial view in cross section of the apparatus.

As shown in FIG. 1, the motor shaft 1 is connected to the conduit shaft 2 through hydrodynamic transmission. The rotor of the pump 3 is connected to the motor shaft 1 and the conduit shaft 2 is connected and fixed to the rotor of the hydromotor 4.

The motor shaft 1 and the rotor of the pump 3 are supported and may rotate on bearings 5 and 6 while conduit shaft 2 and the rotor of the hydromotor 4 are supported and may rotate on bearings 7 and 8.

Figure 2:
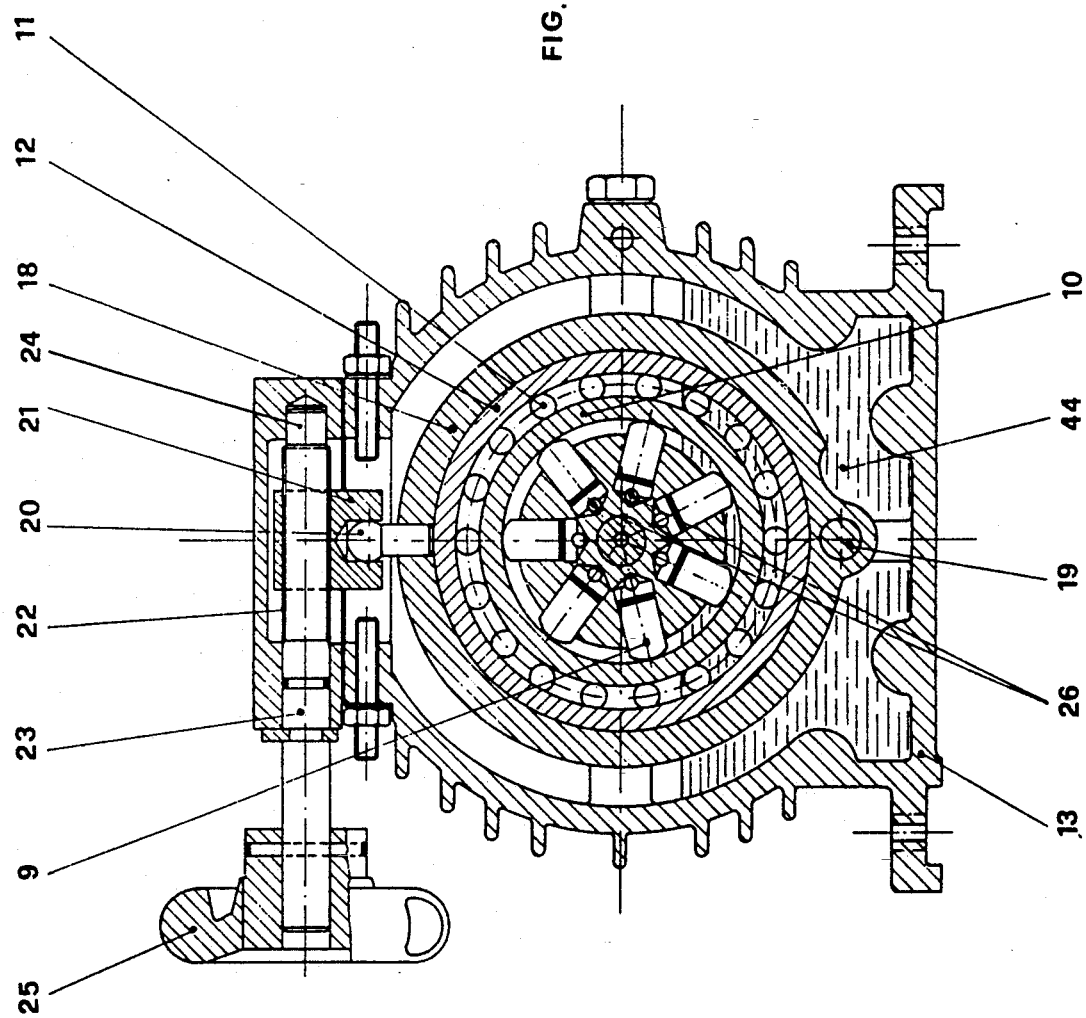
FIG. 2 is a transversal view in cross section of the apparatus according to line II—II of FIG. 1.

The rotor of the pump 3 comprises radial cylindrical cavities in which pistons 9 slide. Pistons 9 are pushed towards and the exterior by the pressure of the liquid, are stopped against the internal ring 10 of the roller bearing 11; the latter having external ring 12 which is fixed to the frame 13 while it is still capable of being displaced in the transversal direction with respect to the frame as shown in FIG. 2.

Figure 5:
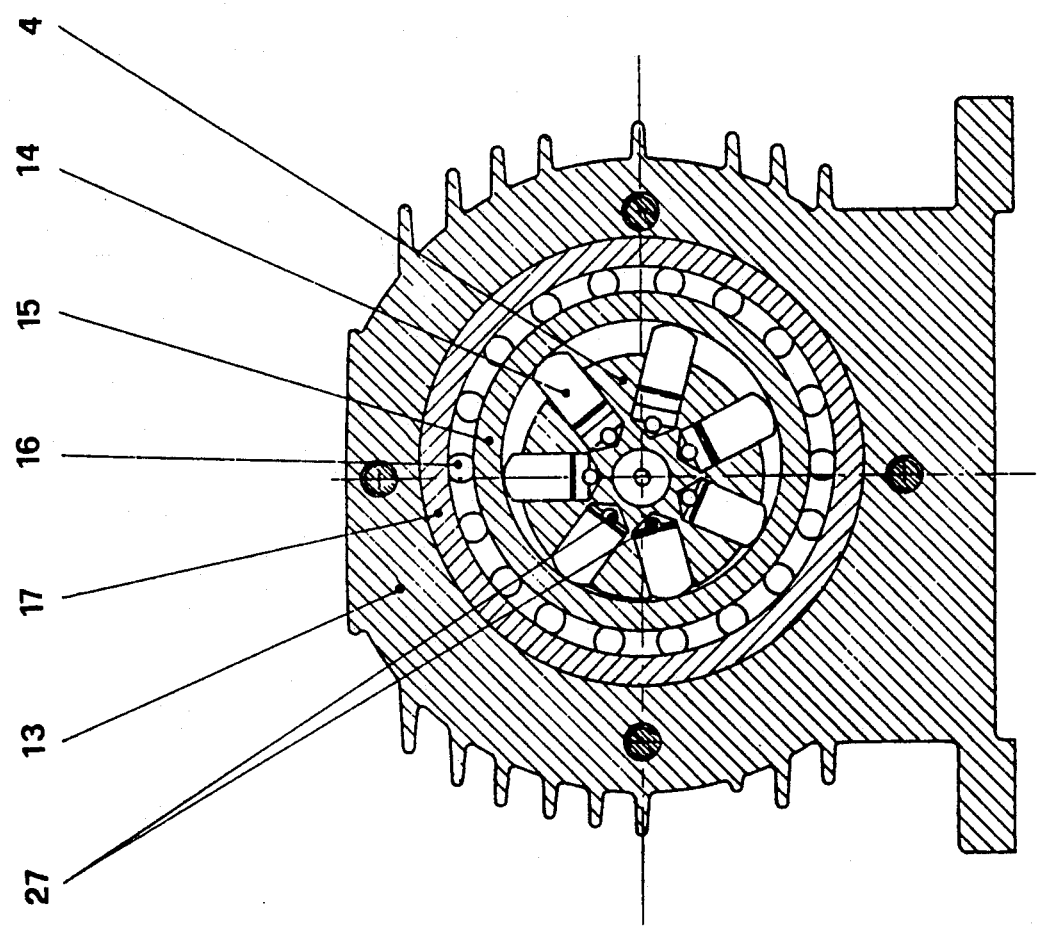
FIG. 5 is a view in cross section of the apparatus according to line V—V.

In an analogous manner, the motor of the hydromotor 4 shown in FIG. 5 comprises radial cylindrical cavities within which pistons 14 slide. The latter are pushed toward the exterior by the pressure of the liquid, are stopped against the internal ring 15 of roller bearing 16, the external ring 17 of which is fixed to the frame 13.

Both pistons 9 and pistons 14 may be placed in positions which are inclined with respect to the planes perpendicular to the axis of the apparatus for the purpose of satisfying particular rolling conditions which improve the functionality of the machine.

One or both of the roller bearings 11 and 16 may have variable eccentricity.

For instance in the embodiment shown in FIG. 2, the external ring 12 of bearing 11 is fixed to the maneuvering ring 18 which is pivoted on the supporting pin 19, being capable of being displaced transversely with respect to the longitudinal axis of the apparatus by means of the actuating assembly. The latter is constituted by the pin with spherical head 20, which is grasped by sleeve 21 which has a threaded orifice in which is screwed screw 22. The latter has cylindrical parts 23 and 24 which may rotate in the interior of the openings formed in the body of the frame 13 and are capable of being placed in rotation by the hand-guide wheel (25) which is hand manuverable. A variation of the eccentricity of the bearing 11 causes a corresponding variation in the maximum course carried out by piston 9 within the respective cylindrical cavities and consequently a variation in the position of each piston.

In the embodiment illustrated in the figures, the hydromotor 4 has a constant eccentricity while the rotating pump 3 may vary its eccentricity in one direction or in the opposite direction. It is, however, clear that also the hydromotor 4 may be made with a variable eccentricity with an arrangement similar to that of pump 3. Each radial cylindrical cavity of pump 3 or of the hydromotor 4 is located corresponding to the axial openings respectively designated by the numeral 26 in FIG. 2 and 27 in FIG. 5 so that they may come in communication with the slits 28 and 29 shown in FIG. 1, the latter being more visible in FIG. 6, of the frontal distributors 30 and 31 shown in FIG. 1. The latter are placed in communication respectively by means of the orifices of conduits 32 and 33 shown in FIG. 4 with the radial cylindrical cavities corresponding to the hydromotor 4 shown in FIG. 1. The longitudinal conduits 32 and 33 are connected respectively by means of transversal conduits 34 and 35 shown in FIG. 4 with the chamber 36, the latter being placed in communication by means of valves 37 and 38 with the delivery chamber of the impeller pump 39 shown in FIG. 3. The valves 37 and 38 which are normally kept closed by means of springs act alternately depending whether the hydromotor 4 rotates in the same direction or in the opposite direction with respect to the pump 3, that is corresponding to an eccentricity which may be discordant or in agreement with respect to the eccentricity of pump 3.

Figure 3:
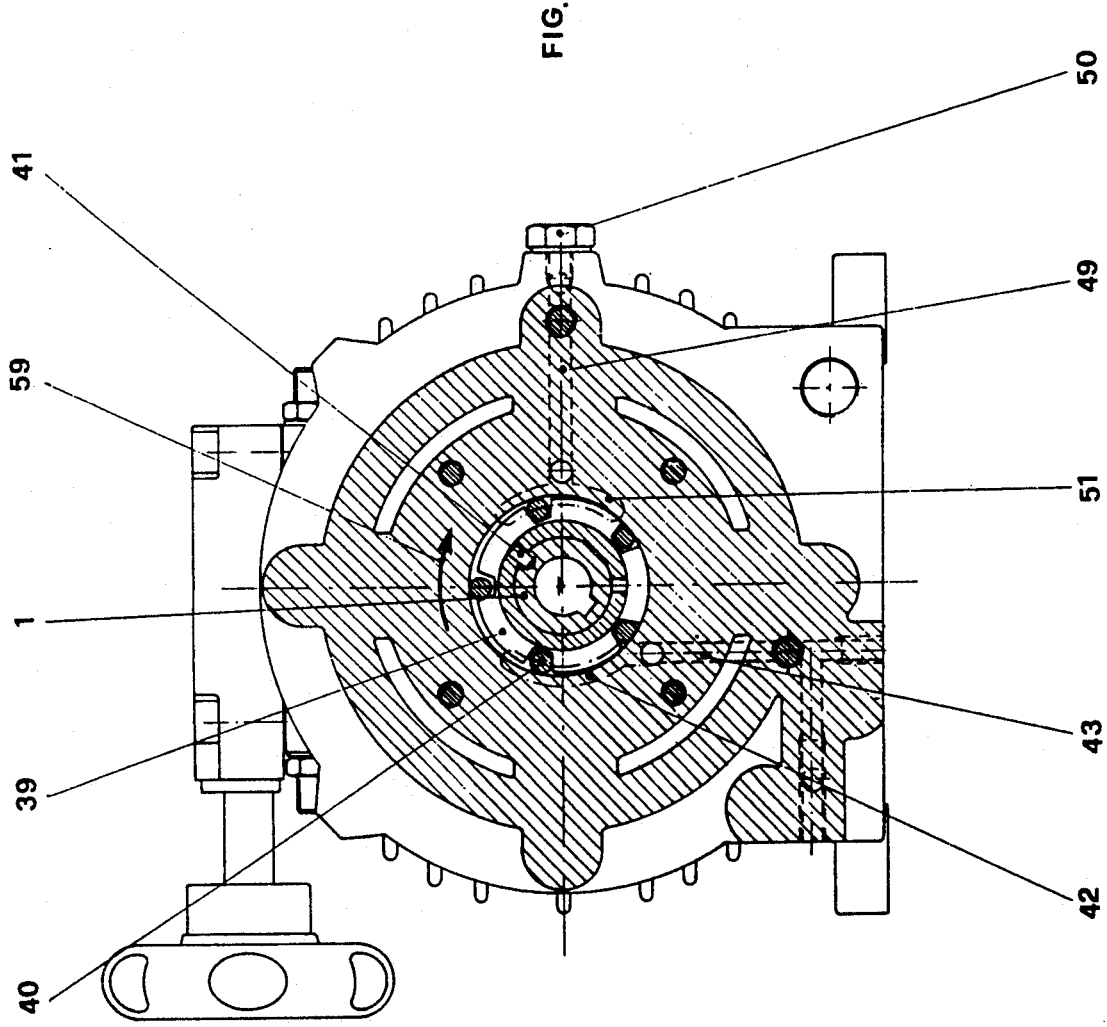
FIG. 3 is a transversal view in cross section of the apparatus according to line III—III of FIG. 1.

In fact, the impelling of the circuit by means of pump 39 shown in FIG. 3 always occurs corresponding to the return conduits of the liquid from the hydromotor 4 to pump 3, the latter being constituted by a rotor provided with radial cavities in which slide rollers 40, the rotor being connected by means of key 41 to the motor shaft 1.

Figure 4:
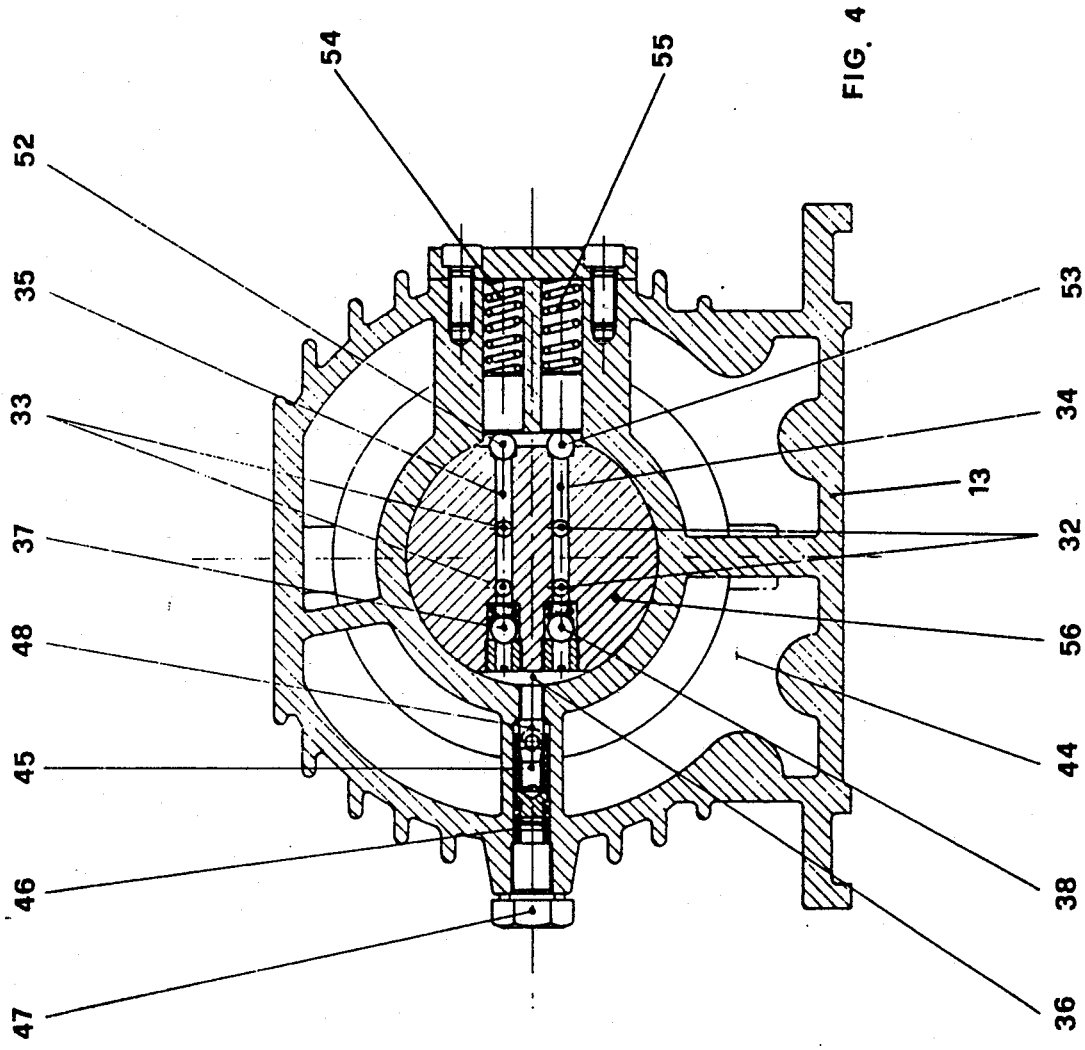
FIG. 4 is a transversal view in cross section of the apparatus according to lines IV—IV.

The suction chamber 42 shown in FIG. 3 of the impeller pump 39 is connected by means of suction conduit 43 to chamber 44 shown in FIG. 4, the latter being disposed within the base of the frame 13, the chamber acting as a reservoir for the liquid.

The valve 45 shown in FIG. 4 is held closed by the spring 46 which is held by screw 47 and permits the discharge through conduit 48 into the container 44 of the excess liquid flow of the impeller pump (39) (FIG. 3).

Conduit 49 closed by stopper 50, which operates like a screw, communicates with the delivery chamber 51 of the pump 39 thus permitting the application for instance of a manometer for measuring the pressure of the liquid within the delivery chamber 51, thus making possible the eventual removal of the liquid under pressure to feed for instance the servo-mechanisms used to command and regulate the variator.

Valves 52 and 53 shown in FIG. 4 determine the maximum pressure of the liquid in the same circuit. In fact, they are held closed by calibrated springs 54 and 55, permitting the discharge of the liquid in chamber 44 which is placed below the cylindrical body 56, when for instance due to a sudden stop of the hydromotor, the pressure of the same could assume dangerous values.

According to a particular embodiment of the variator of the present invention, there is the possibility that the seals between the frontal distributors 30 and 31 and the conduits 32 and 33 formed in the central fixed body of the device, be guaranteed by suitable pistons with rings 57 provided with springs 58 as shown in FIG. 1.

The operation of the variator is clear from an examination of the drawings in addition to the preceding description. In fact, as soon as the motor shaft 1 is placed in rotation, it transmits the motion to the impeller pump 39 which provides to place under pressure through the valves 37 and 38 the hydraulic circuit of the device, drawing the liquid contained in the reservoir 44 located under it. After a few turns, the liquid under pressure fills completely the cylindrical chambers closed by the pistons 9 in pump 3 and by the pistons 14 in the hydromotor 4. The hydromotor 4 begins to rotate in the opposite direction with respect to the pump 3 if its eccentricity is in the same direction as that of pump 3.

With the direction of rotation designated by the arrow 59 shown in FIG. 3, pistons 9 in the upper semicircle are displaced toward the exterior both under the action of the centrifugal force as well as the action of the liquid which enters into the respective cylinders through the openings 26 in the conduit 32, causing the conduit to go through the hydromotor where the contrary takes place.

By varying the eccentricity of the pump, it is possible to vary the amount of the liquid in the pump causing consequently a variation in the number of turns of the hydromotor. More specifically, an increase in the eccentricity of pump 3 results in a greater amount in the flow of oil and consequently an increase in the number of turns of the hydromotor. On the contrary, a decrease in the eccentricity of the pump causes a decrease in the number of turns of the hydromotor. When the eccentricity of the pump is eliminated, the hydromotor stops, while when the eccentricity of the pump assumes the opposite direction, the direction of rotation of the hydromotor and the conduit shaft are reversed.

In effect, pistons 9 of the lower semicircle are pushed towards the exterior by the liquid which come from the openings 26 and from the conduit 32 while pistons 9 of the uppersemi circle push the liquid through the openings 26 to conduit 33 and to the hydromotor 4.

According to a second embodiment of the invention, it is also possible that the eccentricity of the hydromotor is variable so that in this case the number of turn of the conduit shaft is greater than the number of turns of the motor shaft without any further limit in one direction as well as in the opposite direction.

The device of the invention operates with constant power, naturally overlooking the losses due to friction or due to leakage of oil within the limits determined by the dimensions of the apparatus or up to the values of the pressure imposed by the calibration of valve 52 and 53 (see FIG. 4).

Valves 52 and 53 which function as safety valves prevent that in case of a sudden stop of the conduit shaft, the pressure of the liquid may assume dangerous values. Naturally the variator may assume also some forms different from the present forms. For instance, the pump may be separated from the hydromotor and may be connected to it through tubes.

It is also possible that the conduit shaft exit orthogonally with respect to the motor shaft, always remaining within the scope of the invention.

The advantages due to both elimination of mechanical joints such as the joints of the Obdan type on the inlet shaft and/or the exit shaft are evident, both in the position of the impeller pump which is placed in front of the machine and therefore it is accessible to operations of upkeep and substitution, as well as in the particular arrangement of the rollers radially movable and subjected to centrifugal force and also all the properties of the rollers resting on trapazoidal seats, a fact which facilitates the adherence of the roller to the external generatrix.

The front distributors formed with a cap and autobalanced increase the adherence in relation to the pressure depending on the motive and resisting pairs.

The pistons with rings 57, with springs 58 ensure the seal between the central distributors 30 and 31 and conduits 32 and 33.

A clear advantage of the invention resides in the fact that the calibrated springs 54 and 55 permit the discharge of the liquid in the chamber 44 which is located under the cylindrical body 56 when the pressure of the same will assume dangerous values.

It is clear that the variator of the present invention has been described and illustrated in the accompanying drawings in a particular embodiment of construction which has been provided by way of example but is not limited by it because it may assume different forms and aspects while maintaining the characteristics of the present invention.

What is claimed is:

1. A hydrodynamic variator of velocity apparatus which comprises a frame (13), a fixed central body (56), a rotating pump (3) located at the head of said apparatus, said pump having first rotating pistons (9), said pump (3) having a rotor, said rotor having first cylindrical cavities, said rotating pistons (9) sliding within said first cylindrical cavities, a first roller bearing (11) having a first ring (12) disposed externally thereto, a hydromotor (4) having second rotating pistons (14), said hydromotor having second cylindrical cavities, said second rotating pistons (14) sliding within said second cylindrical cavities, said roller bearing (11) having a second ring (10) internally disposed thereto, said hydromotor (4) having a second roller bearing (16), a third ring (17) disposed externally with respect to said second roller bearing, a fourth ring (15) disposed internally with respect to said second roller bearing, said first ring (12) and said third ring (17) being fixed to said frame (13), said first and second pistons (9) and (14) being pushed towards the exterior of the apparatus by the pressure of the liquid and being stopped against said second and fourth internal rings (10 and 15) of said first and second roller bearings (11 and 16), said hydromotor having variable eccentricity, and non-rotating front distributors (30, 31), said central body having in the interior thereof conduits (32, 33), said conduits having axial openings (26,27), said distributors being placed in communication by means of said axial openings with said cylindrical cavities of said hydromotor (4), said hydromotor (4) being capable of rotating in the same direction or in the opposite direction with respect to the pump (3) corresponding to an eccentricity which is discordant or in accordance with the eccentricity of the pump (3), said hydrodynamic variator being provided with annular seals constituted by third pistons having rings (57) provided with first springs (58), said seals being placed in said non-rotating front distributors (30 and 31) whereby the liquid passes from said pump to said hydromotor through said conduits (32 and 33).

2. The apparatus according to claim 1 which comprises an impeller pump (39) located on the head of the apparatus corresponding to said rotating pump (3), and the apparatus further comprises a chamber (44) located within the base of said frame (13), said impeller pump (39) being connected by means of suction conduit (43) to said chamber (44), said chamber acting as the reservoir for the liquid, said chamber (44) being disposed below said fixed central body (56).

3. The hydrodynamic variator of velocity apparatus according to claim 1 wherein the apparatus has an axis of rotation, the radial pistons (9 and 14) respectively of the pump and the hydromotor are located on slightly inclined planes with respect to the planes perpendicular to said axis of rotation of the apparatus.

4. The hydrodynamic variator of velocity apparatus according to claim 1 which is provided with first valves (52,53) and second valves (37,38), said fixed central body (56) serving as a seat for said first valves and said second valves, said first valves regulating the maximum pressure of the liquid in the circuit, said second valves being normally closed by second springs, said second springs urging alternately depending whether said hydromotor (4) rotates in the same direction or in the opposite direction with respect to said rotating pump (3), corresponding to the eccentricity which is discordant or concordant with respect to the eccentricity of said pump (3).

5. The hydrodynamic variator of velocity apparatus according to claim 2 wherein said pump has a flange for regulating (18), and the apparatus comprises a handwheel (25) whereby the eccentricity of at least one of said rotating pump and said hydromotor is varied from a maximum position in one direction to another maximum in the opposite direction whereby the velocity of rotation of the hydromotor in one direction as well as in the other direction varies with respect to the direction of rotation of the pump with great limits.

* * * * *